US008742955B2

(12) United States Patent
Tsutsui

(10) Patent No.: US 8,742,955 B2
(45) Date of Patent: Jun. 3, 2014

(54) MAP DISPLAY APPARATUS, MAP DISPLAY METHOD, AND IMAGE PICKUP APPARATUS

(75) Inventor: Masanao Tsutsui, Kanagawa (JP)

(73) Assignee: Sony Corporation (JP)

( * ) Notice: Subject to any disclaimer, the term of this patent is extended or adjusted under 35 U.S.C. 154(b) by 637 days.

(21) Appl. No.: 12/734,623

(22) PCT Filed: Nov. 26, 2008

(86) PCT No.: PCT/JP2008/071463
§ 371 (c)(1),
(2), (4) Date: May 12, 2010

(87) PCT Pub. No.: WO2009/069664
PCT Pub. Date: Jun. 4, 2009

(65) Prior Publication Data
US 2010/0265360 A1 Oct. 21, 2010

(30) Foreign Application Priority Data
Nov. 30, 2007 (JP) ................ P2007-311328

(51) Int. Cl.
*G08G 1/123* (2006.01)
*G08B 3/00* (2006.01)
*H04N 13/02* (2006.01)
*G09G 5/00* (2006.01)

(52) U.S. Cl.
USPC ............... 340/990; 340/995.1; 340/995.12; 340/995.14; 340/691.6; 348/47; 348/143; 348/231.3; 345/634

(58) Field of Classification Search
USPC ............................ 340/990, 995.1, 995.14
See application file for complete search history.

(56) References Cited
U.S. PATENT DOCUMENTS 5,212,643 A * 5/1993 Yoshida .................. 701/455
5,680,313 A * 10/1997 Whittaker et al. ............ 701/300
5,908,465 A * 6/1999 Ito et al. ..................... 701/532

(Continued)

FOREIGN PATENT DOCUMENTS

EP      2196975 A1    6/2010
JP      09-243379 A   9/1997

(Continued)

OTHER PUBLICATIONS

Supplementary European Search Report EP 08853270, dated Aug. 23, 2012.

*Primary Examiner* — Fekadeselassie Girma
(74) *Attorney, Agent, or Firm* — Lerner, David, Littenberg, Krumholz & Mentlik, LLP

(57) ABSTRACT

In step ST11 of FIG. 5, a map image is displayed. In step ST12, moving-route marks are added to the map image. In step ST13, image-pickup-position marks are added to the map image. In step ST14, a current position mark is added to the map image. In step ST15, a predetermined range is determined based on an image-pickup position. Furthermore, predetermined ranges are determined based on a moving route and a current position. In step ST16, the number of types of landmark sign to be included in the map image is reduced in ranges other than the predetermined ranges. Since landmark signs which are positioned far from the image-pickup position, the moving route, and the current position and which are not important for a user are not added to the map image, map display is performed while display of the landmark signs is optimized.

5 Claims, 5 Drawing Sheets

(56) References Cited

U.S. PATENT DOCUMENTS

| | | | |
|---|---|---|---|
| 6,018,697 A * | 1/2000 | Morimoto et al. | 701/411 |
| 6,055,042 A * | 4/2000 | Sarangapani | 356/4.01 |
| 6,487,305 B2 | 11/2002 | Kambe et al. | |
| 6,714,664 B2 | 3/2004 | Kambe et al. | |
| 6,906,643 B2 | 6/2005 | Samadani et al. | |
| 7,149,961 B2 | 12/2006 | Harville et al. | |
| 2002/0026289 A1* | 2/2002 | Kuzunuki et al. | 702/150 |
| 2002/0154213 A1* | 10/2002 | Sibyama et al. | 348/47 |
| 2004/0070602 A1 | 4/2004 | Kobuya et al. | |
| 2004/0078813 A1 | 4/2004 | Kobuya et al. | |
| 2005/0144049 A1* | 6/2005 | Kuzunuki et al. | 705/6 |
| 2006/0026170 A1 | 2/2006 | Kreitler et al. | |
| 2006/0069503 A1* | 3/2006 | Suomela et al. | 701/211 |
| 2009/0119008 A1 | 5/2009 | Kobuya et al. | |

FOREIGN PATENT DOCUMENTS

| | | | | |
|---|---|---|---|---|
| JP | 2002-056321 A | 2/2002 | | |
| JP | 2002-071368 A | 3/2002 | | |
| JP | 2002-131070 A | 5/2002 | | |
| JP | 2002-197150 A | 7/2002 | | |
| JP | 2003-263103 A | 9/2003 | | |
| JP | 2004-070598 A | 3/2004 | | |
| JP | 2004-170266 A | 6/2004 | | |
| JP | 2006-145225 A | 6/2006 | | |
| JP | 2006-177790 A | 7/2006 | | |
| JP | 2006-526152 T | 11/2006 | | |
| JP | 2007-166084 A | 6/2007 | | |
| WO | WO 9515542 A1 * | 6/1995 | | G07F 17/02 |
| WO | 02063243 A1 | 8/2002 | | |
| WO | WO-2005/017780 A1 | 2/2005 | | |

\* cited by examiner

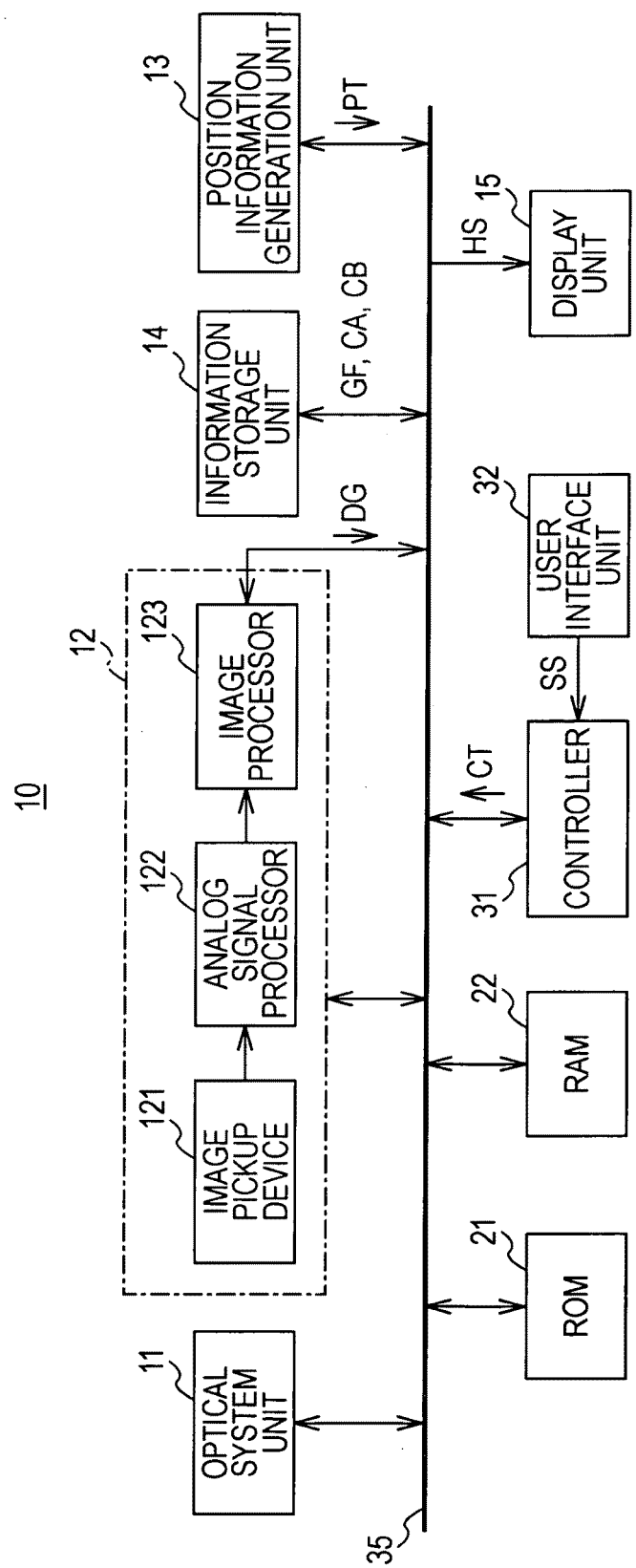

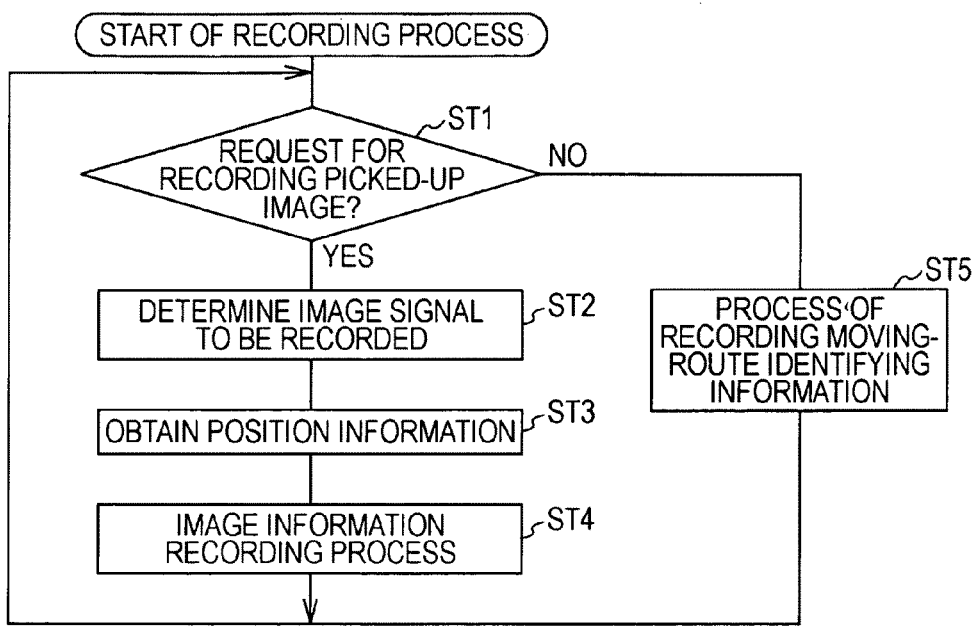

| (TIME) | LATITUDE AND LONGITUDE |
|---|---|
| 09:05 | **. 67 × **. 51 |
| 09:10 | **. 67 × **. 50 |
| 09:15 | **. 67 × **. 49 |
| 09:20 | **. 67 × **. 48 |
| 09:25 | **. 67 × **. 48 |
| 09:30 | **. 66 × **. 47 |
| 09:35 | **. 65 × **. 46 |
| 09:40 | **. 64 × **. 45 |
| 09:45 | **. 63 × **. 44 |
| 09:50 | **. 62 × **. 43 |
| 09:55 | **. 62 × **. 42 |
| 10:00 | **. 60 × **. 41 |
| ⋮ | ⋮ |
| 11:25 | **. 50 × **. 34 |

FIG. 6

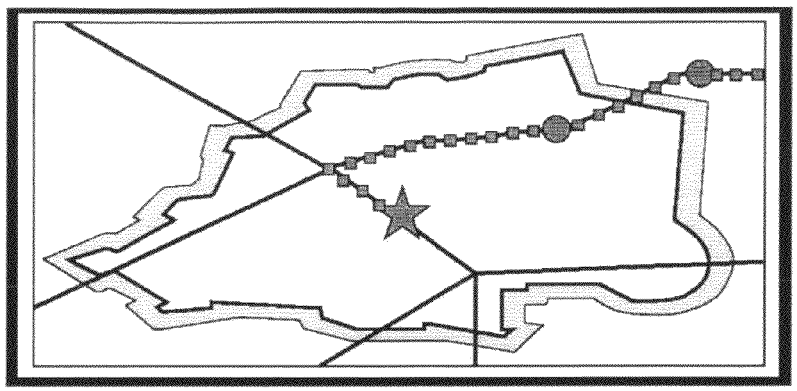

FIG. 7

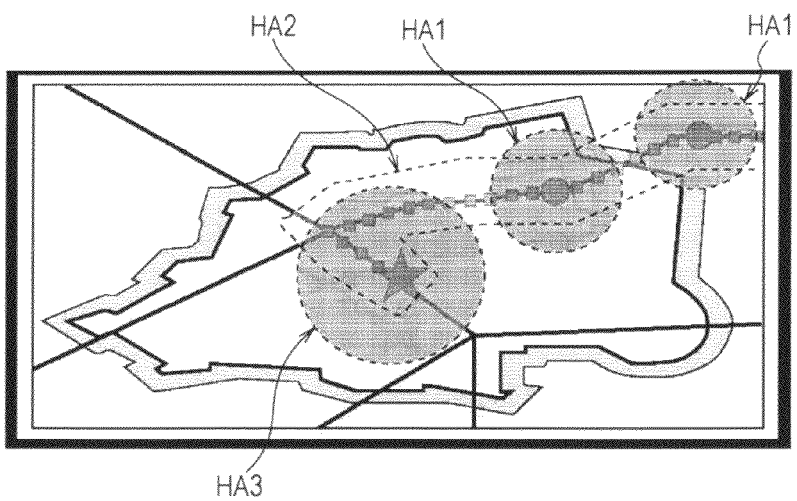

FIG. 8

| LANDMARK SIGN (TYPE) | FIRST PREDETERMINED RANGE (BASED ON IMAGE-PICKUP POSITION) | SECOND PREDETERMINED RANGE (BASED ON MOVING ROUTE) | THIRD PREDETERMINED RANGE (BASED ON CURRENT POSITION) | OTHERS |
|---|---|---|---|---|
| TOURIST FACILITIES | DISPLAY | DISPLAY | DISPLAY | DISPLAY |
| RESTAURANT | DISPLAY | DISPLAY | DISPLAY | NONDISPLAY |
| CONVENIENCE STORE | NONDISPLAY | NONDISPLAY | DISPLAY | NONDISPLAY |
| BANK | NONDISPLAY | NONDISPLAY | NONDISPLAY | NONDISPLAY |

MAP DISPLAY APPARATUS, MAP DISPLAY METHOD, AND IMAGE PICKUP APPARATUS

CROSS-REFERENCES TO RELATED APPLICATIONS

The present application is a national phase entry under 35 U.S.C. §371 of International Application No. PCT/JP2008/071463 filed Nov. 26, 2008, published on Jun. 4, 2009 as WO 2009/069664 A1, which claims priority from Japanese Patent Application No. JP 2007-311328 filed in the Japanese Patent Office on Nov. 30, 2007.

TECHNICAL FIELD

The present invention relates to map display apparatuses, map display methods, and image pickup apparatuses. Specifically, an image-pickup-position mark is displayed in an image-pickup position in a map image, and the number of types of landmark sign are reduced in ranges other than a first predetermined range determined based on the image-pickup position. By this, display of landmark signs is optimized so that landmark signs which are important for a user are not buried in a number of landmark signs.

BACKGROUND ART

Conventionally, map display apparatuses which display map images are used for navigation usages in many cases. Therefore, landmark signs are displayed in map images so as to be mainly used for a navigation usage together with the map images. Furthermore, in such a map display apparatus used for a navigation usage, a function of selecting landmark signs which meet user's needs in accordance with a setting performed by the user, that is, a function of selecting landmark signs representing tourist facilities, restaurants, and the like and displaying the selected landmark signs in a map image has been provided.

Furthermore, in a navigation apparatus disclosed in Japanese Unexamined Patent Application Publication No. 9-243379, a plurality of graphic information items are classified into a plurality of groups and only information items included in a group which is requested by a user are displayed (refer to a paragraph number [0053]). Furthermore, in a map information display method and a map information display apparatus disclosed in Japanese Unexamined Patent Application Publication No. 2004-170266, taking a usage outside of a vehicle into consideration, a technique of automatically changing information displayed when the apparatus is installed in the vehicle and information displayed when the apparatus is not installed in the vehicle from one to another has been proposed (refer to a paragraph [0039]).

DISCLOSURE OF INVENTION

Technical Problem

Here, if a picked-up image and position information are associated with each other at a time of image pickup before recording, an image-pickup position may be thereafter displayed in a map image using the position information. Furthermore, if an image-pickup-position mark and landmark signs are included in the map image, the landmark signs may remind the user of objects around the image-pickup position or provide a clue to a memory.

Here, landmark signs important for the user are displayed near the image-pickup position and landmark signs positioned far from the image-pickup position are not so important. However, if landmark signs are displayed similarly to the conventional map display apparatus and the example of Japanese Unexamined Patent Application Publication No. 9-243379, all landmark signs corresponding to selected types are displayed in the map image. That is, since the map image also includes landmark signs which are not important for the user, it is possible that landmark signs which are important for the user are buried in a number of landmark signs and become indistinctive.

Technical Solution

According to a concept of the present invention, an image-pickup-position mark representing an image-pickup position and a plurality of types of landmark sign, i.e., landmark signs representing tourist facilities and landmark signs representing restaurants are included in a map image, and the number of landmark signs is reduced by reducing the types of landmark sign included in the map image in ranges other than a first predetermined range determined based on the image-pickup position.

A map display apparatus which displays a map image according to the present invention includes an information recording unit which records image information including an image signal representing a picked-up image and position information representing an image-pickup position where the image signal is generated, and landmark information used to display landmark signs in a map image, and a display controller which adds an image-pickup-position mark in an image-pickup position represented by the image information to the map image, which adds landmark signs in portions represented by the landmark information to the map image, and which reduces the number of types of landmark sign to be added to the map image in ranges other than a first predetermined range determined based on the image-pickup position.

Furthermore, a map display method according to the present invention employed in a map display apparatus which displays a map image includes an information reading step of reading, from an information recording unit which records image information including an image signal representing a picked-up image and position information representing an image-pickup position where the image signal is generated and landmark information used to display landmark signs in a map image, the image information and the landmark information, and a display control step of, in accordance with the read image information and the read landmark information, adding an image-pickup-position mark in an image-pickup position represented by the image information to the map image, adding landmark signs in portions represented by the landmark information to the map image, and reducing the number of types of landmark sign to be added to the map image in ranges other than a first predetermined range determined based on the image-pickup position.

Moreover, an image pickup apparatus according to the present invention capable of displaying a map image includes an image pickup unit which generates an image signal representing a picked-up image, a position information generation unit which generates position information representing a position of the image pickup unit, an information recording processor which generates and records, using the position information generated by the position information generation unit when the image signal representing the picked-up image is generated as position information representing an image-pickup position, image information including the position information and the image signal representing the picked-up image, a landmark information storage unit which stores landmark information used to add landmark signs to the map image, and a display controller which adds an image-pickup-position mark in the image-pickup position represented by the image information to the map image, which adds the landmark signs in portions represented by the landmark information to the map image, and which reduces the number of types of landmark sign to be added to the map image in ranges other than a first predetermined range determined based on the image-pickup position.

According to the present invention, an image-pickup-position mark in an image-pickup position and landmark signs are displayed in a map image. Here, in ranges other than a first predetermined range determined based on the image-pickup position, a reduced number of types of landmark sign are included in the map image and the number of landmark signs included in the ranges other than the first predetermined range is reduced. Furthermore, moving-route marks are added to the map image, and a reduced number of types of landmark sign are shown in ranges other than a second predetermined range determined based on the moving route in the map image. Furthermore, a current position mark is added to the map image, and a reduced number of types of landmark sign are included in ranges other than a third predetermined range determined based on a current position in the map image. Moreover, the types of landmark sign to be added to the predetermined ranges in the map image and the types of landmark sign to be added to the ranges other than the predetermined ranges in the map image may be changed in accordance with a user's operation. Accordingly, landmark signs which are important for the user are prevented from becoming indistinctive due to a number of landmark signs included in the map image.

BRIEF DESCRIPTION OF DRAWINGS

FIG. 1 is a diagram illustrating a configuration of an image pickup apparatus employing a map display apparatus according to the present invention.

FIG. 2 is a flowchart illustrating an operation performed when a picked-up image is recorded.

FIG. 3 is a diagram illustrating image information including position information representing image-pickup positions and image IDs.

FIG. 6 is a diagram illustrating a displayed image including image-pickup positions, a moving route, and a current position.

FIG. 7 shows a diagram illustrating first to third predetermined ranges.

FIG. 8 is a diagram illustrating a landmark-display control table.

BEST MODE FOR CARRYING OUT THE INVENTION

Figures 4, 5:
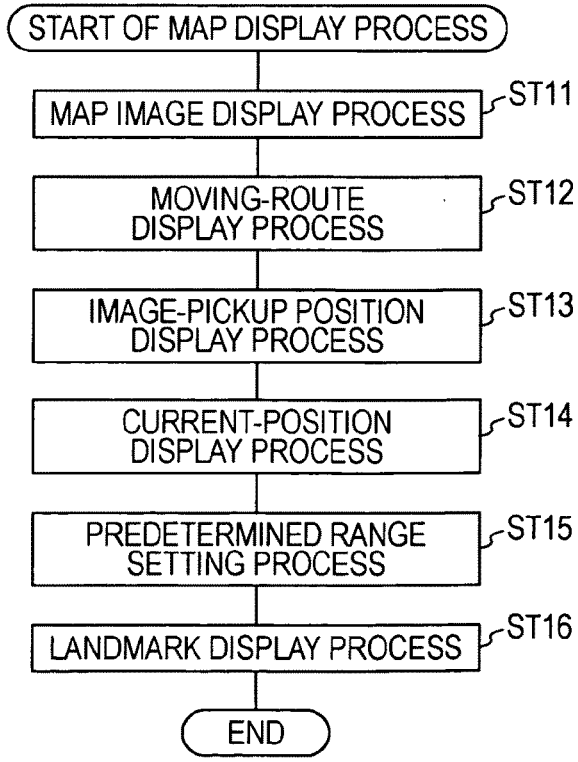
FIG. 4 is a diagram illustrating moving-route identifying information obtained in a predetermined cycle.
FIG. 5 is a flowchart illustrating a landmark display operation.

An object of the present invention is to provide a map display apparatus, a map display method, and an image pickup apparatus which are capable of displaying a map by optimizing display of landmark signs so that information desired by a user is easily obtained.

Hereinafter, an embodiment of the present invention will be described with reference to the accompanying drawings. An optical system unit 11 of an image pickup apparatus 10 shown in FIG. 1 includes a lens, a zooming system, and the like. The optical system unit 11 is used to form an optical image on an imaging surface of an image pickup device 121 disposed on a rear side relative to the lens along an optical axis.

The image pickup device 121 included in an image pickup unit 12 generates an analog image signal corresponding to an optical image through photoelectric conversion and supplies the analog image signal to an analog signal processor 122. The analog signal processor 122 performs an analog-image-signal process such as noise removal, gain control, and the like on the analog image signal supplied from the image pickup device 121. Furthermore, the analog signal processor 122 includes an A/D convertor which converts the analog image signal subjected to the analog-signal process into a digital image signal to be supplied to an image processor 123.

The image processor 123 performs a digital-image-signal process such as color control, image quality control, and the like using the digital image signal supplied from the analog signal processor 122. Furthermore, the image processor 123 performs a compression process on the image signal which has been subjected to the digital-image-signal process and a decompression process on the image signal which has been subjected to the compression process. As a compression method, a lossy compression method such as a JPEG (Joint Photographic Expert Group) method is used. Furthermore, the image processor 123 may generate a lossless compression signal or an uncompressed signal in a RAW method, and may generate an uncompressed signal in a TIFF (Tagged Image File Format) method. Hereinafter, an uncompressed or compressed image signal is simply referred to as an image signal DG.

A position information generation unit 13 is constituted by a GPS (Global Positioning System) module. The GPS module includes an antenna unit which receives GPS electric waves, a signal convertor which processes received electric waves, a position information calculating unit, and the like. The GPS module is integrally attached to the image pickup unit 12, and generates position information PT representing a position of the image pickup unit 12 (or the image pickup apparatus 10 in a case where another portion of the image pickup unit 12 is integrated with the GPS module).

An information storage unit 14 is configured by a recording medium such as a nonvolatile memory, an optical disc, or a hard disk device. The information storage unit 14 stores image information GF configured by an image signal DG, position information PT obtained when the image signal DG is generated, and the like, and position information PT generated in a predetermined cycle by the position information generation unit 13. Furthermore, the information storage unit 14 stores, for example, map information used to display a map image and landmark information used to display landmark signs representing characteristic facilities such as tourist facilities, restaurant, convenience stores, and the like in the map image. The landmark information corresponds to so-called "POI (Point of Interest)" information. Note that the landmark information is at least associated with information on a position of a characteristic facility, information on a graphic and text to be displayed in the map image, and information on a type of landmark sign which represents a certain category to which the characteristic facility such as a tourist facility or a restaurant belongs.

A display unit 15 is configured by liquid crystal display elements and the like, and displays a finder image in accordance with an image signal output from the image pickup unit 12. Furthermore, the display unit 15 performs display of a picked-up image in accordance with an image signal stored in the information storage unit 14 and display of a map image in accordance with map information stored in the information storage unit 14. Moreover, the display unit 15 displays various menus, and the like.

A ROM (Read Only Memory) 21 stores a program used to operate the image pickup apparatus 10. A RAM (Random Access Memory) 22 corresponds to a working memory used to temporarily store data when the image pickup apparatus 10 is operated.

A user interface unit 32 is connected to a controller 31. The user interface unit 32 is configured by a shutter button and an operation dial used to switch image-pickup modes from one to another, generates an operation signal SS in accordance with a user's operation, and supplies the operation signal SS to the controller 31.

The controller 31 is connected to the various units through a bus 35. The controller 31 reads and executes programs stored in the ROM 21 so that the operation of the image pickup apparatus 10 is activated. Furthermore, the controller 31 generates a control signal CT in accordance with the operation signal SS supplied from the user interface unit 32 and supplies the control signal CT to the various units so as to operate the image pickup apparatus 10 in accordance with the user's operation.

Furthermore, the controller 31 and the information storage unit 14, for example, constitute an information recording processor. When recording an image signal which represents a picked-up image and which has been generated by the image pickup unit 12 in the information storage unit 14, the controller 31 records, using position information generated by the position information generation unit 13 as position information representing an image-pickup position, image information GF including the position information and the image signal representing the picked-up image in the information storage unit 14. Furthermore, the controller 31 records the position information PT generated by the position information generation unit 13 in the predetermined cycle as position information representing a moving route in the information storage unit 14.

Furthermore, the controller 31 performs display control. The controller 31 performs display of a map image on the screen of the display unit 15 using the map information stored in the information storage unit 14. Furthermore, the controller 31 displays marks representing an image-pickup position, a moving route, and a current position in the map image in accordance with the image information recorded in the information storage unit 14, the position information generated in the predetermined cycle, and the position information generated by the position information generation unit 13. Moreover, when landmark signs are to be displayed in the map image in accordance with the landmark information stored in the information storage unit 14, the controller 31 performs display optimization so that the user can easily identify landmark signs which are important for the user. Specifically, the number of types of landmark sign is reduced in ranges other than a predetermined range determined based on the image-pickup position. Similarly, the number of types of landmark sign is reduced in ranges other than a predetermined range determined based on the moving route or the current position.

Referring now to FIG. 2, operation of the image pickup apparatus will be described. In FIG. 2, the controller 31 determines whether a request for recording a picked-up image has been issued in step ST1. When it is determined that the request for recording a picked-up image has been issued, that is, when it is determined that a shutter button (REC button) included in the user interface unit 32 has been operated, the controller 31 proceeds to step ST2. When it is determined that the shutter button (REC button) has not been operated, the controller 31 proceeds to step ST5.

In step ST2, the controller 31 determines an image signal to be recorded. When the image pickup apparatus is in a still-image recording mode, the controller 31 determines that an image signal representing a picked-up image obtained when the shutter button is operated is to be recorded, and proceeds to step ST3. Furthermore, when the image pickup apparatus is in a moving-image recording mode, the controller 31 determines that image signals representing picked-up images obtained from when a recording start operation is performed using the REC button to when a recording end operation is performed are to be recorded, and proceeds to step ST3.

In step ST3, the controller 31 obtains position information. The controller 31 obtains position information generated by the position information generation unit 13, and proceeds to step ST4.

In step ST4, the controller 31 performs image information recording processing. The controller 31 generates image information GF including the position information representing an image-pickup position obtained in step ST3 and the image signal determined to be recorded in step ST2, and records the image information GF in the information storage unit 14.

For example, when the image pickup apparatus is in the still-image recording mode, still images are recorded in a certain file format referred to as the Exif (Exchangeable Image File Format). Alternatively, still images are recorded using a DCF (Design rule for Camera File system) standard which is a standard of a camera file system employing the Exif. In the Exif, a single file includes an image signal representing a still image and Exif data. The Exif data may include tags representing additional information such as information on the still image and information on date and time of photographing. Furthermore, an example of the tags may include a tag "GPS Info" representing GPS information. Therefore, the controller 31 generates a file of the Exif format or the DCF standard in which the position information representing the image-pickup position is set in the tag "GPS Info", and records the file in the information storage unit 14 as the image information GF.

As described above, in the Exif, a single file includes an image signal representing a still image and Exif data. FIG. 3 shows a list including file names and information represented by tags of the Exif data such as dates of photographing, times of photographing, image IDs, and latitudes and longitudes.

In a case where a process of recording a still image is first performed at 9:23 on Jan. 23, 2007 in a position represented by a latitude and longitude of "0.67×0.48" (* represents omission of a number), the controller 31 generates a file "DSC00001.JPG" and stores the file in the information storage unit 14. As for the file "DSC00001.JPG", the tags of the Exif data represent the date of photographing "23/01/2007", the time "09:23", a latitude and longitude "0.67×0.48", and the like. The image IDs are information used to uniquely identify picked-up images, and different picked-up images have different image IDs. Note that an image ID of the file "DSC00001.JPG" is "1", for example.

Next, when another still image is to be recorded, the controller 31 generates a file "DSC00002.JPG" and stores the file in the information storage unit 14. The file "DSC00002.JPG" represents a date of photographing "23/01/2007", a time "10:

01", an image ID "2", a latitude and longitude "0.60×0.41", and the like. Similarly, the controller 31 generates a file every time a still image is recorded and stores the file in the information storage unit 14.

When the image pickup apparatus 10 is in the moving-image recording mode, the controller 31 adds image-pickup position information to header information, for example, in a format employed in moving-image recording. Furthermore, the controller 31 may record the image-pickup position information separately from image signals representing still images and moving images in a database and search for image-pickup position information corresponding to an image signal representing a certain still image or a certain moving image. The controller 31 performs the image information recording processing in this way and returns to step ST1.

When it is determined that the request for recording a picked-up image has not been supplied in step ST1, the controller 31 proceeds to step ST5 where the controller 31 performs a process of recording moving-route identifying information. The controller 31 obtains position information from the position information generation unit 13 in a predetermined cycle. The controller 31 stores the obtained position information as moving-route identifying information or stores the obtained position information after being associated with time information as moving-route identifying information in the information storage unit 14, and returns to step ST1. Note that the predetermined cycle is set in advance so that a temporal resolution of a moving route of the image pickup unit 12 corresponds to a desired resolution. Alternatively, the predetermined cycle may be set by the user.

FIG. 4 shows examples of the moving-route identifying information. For example, in a case where a moving route is determined every five minutes, the controller 31 obtains position information from the position information generation unit 13 five minutes after preceding position information is obtained. Note that the moving-route identifying information may represent a moving route in time series not only using the position information but also using the position information associated with time. The controller 31 performs the process of recording moving-route identifying information as described above, and returns to step ST1.

Note that, assuming that the process of recording moving-route identifying information is performed every time position information is obtained in step ST5, the process of recording information is frequently performed when a time interval for obtaining of position information is short. Accordingly, the information is efficiently recorded if the process of recording moving-route identifying information is performed when an obtainment of position information is performed the predetermined number of times or when a predetermined amount of information has been reached.

Referring now to FIG. 5, a map display process will be described. In FIG. 5, the controller 31 performs a map image display process in step ST11. The controller 31 reads map information recorded in the information storage unit 14 and displays a map image in the screen of the display unit 15 in accordance with the read map information. Here, the controller 31 reads the map information based on a current position obtained in accordance with the position information generated by the position information generation unit 13, and displays the map image including the current position at the center of the screen. Then, the controller 31 proceeds to step ST12. Alternatively, the controller 31 may perform display as below when a position in a map to be displayed in the display unit 15 is specified in accordance with an operation signal SS supplied from the user interface unit 32. The controller 31 reads map information based on the specified position and displays a map image including the specified position at the center of the screen. Furthermore, when position information is not generated by the position information generation unit 13 or is not specified by a user's operation, the controller 31 may display a map image which has been previously displayed in the screen of the display unit 15. Note that the subsequent drawings employ a case where a map image is displayed based on a current position.

In step ST12, the controller 31 performs a moving route display process. The controller 31 reads moving-route identifying information representing positions in the map image displayed in the display unit 15 from the information storage unit 14, displays moving-route marks in the positions in the map image represented by the read moving-route identifying information, and proceeds to step ST13. For example, the controller 31 adds square marks as the moving-route marks in the positions in the map image represented by the read moving-route identifying information as shown in FIG. 6, and proceeds to step ST13.

In step ST13, the controller 31 performs an image-pickup position display process. The controller 31 reads image information representing positions in the map image displayed in the display unit 15 from the information storage unit 14, adds image-pickup-position marks in the positions in the map image represented by the read image information, and proceeds to step ST14. For example, as shown in FIG. 6, the controller 31 adds circle marks as the image-pickup-position marks in the positions in the map image represented by the image information, and proceeds to step ST14.

In step ST14, the controller 31 performs a current-position display process. The controller 31 reads position information from the position information generation unit 13, adds a current position mark in a position in the map image represented by the read position information, and proceeds to step ST15. For example, as shown in FIG. 6, the controller 31 adds a star mark as the current position mark in a current position in the map image, and proceeds to step ST15.

In step ST15, the controller 31 performs a predetermined-range setting process. The controller 31 sets predetermined ranges based on the positions in the map image represented by the moving-route identifying information read in step ST12, the image information read in step ST13, and the position information read in step ST14, and proceeds to step ST16. For example, the controller 31 sets a first predetermined range based on an image-pickup position in the map image obtained in accordance with the image information. Furthermore, the controller 31 sets a second predetermined range based on a moving route in the map image obtained in accordance with the moving-route identifying information. Moreover, the controller 31 sets a third predetermined range based on a current position in the map image in accordance with the position information read in step ST14, and proceeds to step ST16.

Here, the controller 31 determines a range of several tens of meters or several hundreds of meters from a reference position to be a predetermined range. Furthermore, the controller 31 may determine a range of several tens of pixels or several hundreds of pixels from a reference position in the displayed map image to be a predetermined range.

Referring to FIG. 7, the first to third predetermined ranges will be described. For example, the controller 31 sets first predetermined ranges HA1 based on image-pickup positions represented by the image information. Furthermore, the controller 31 sets a second predetermined range HA2 based on a moving route represented by the moving-route identifying information. Moreover, the controller 31 sets a third predetermined range HA3 based on a current position.

In step ST16, the controller 31 performs a landmark display process. The controller 31 adds landmark signs to the map image in accordance with the landmark information recorded in the information storage unit 14. Here, the controller 31 controls types of landmark sign to be added to the predetermined ranges set in step ST15 and other ranges in the map image. In this control of types of landmark sign, a landmark-display control table is used. Note that the landmark-display control table may be stored in the ROM 21 or the like, or may be stored in the information storage unit 14 in advance.

Referring to FIG. 8, the landmark-display control table will be described. The landmark-display control table shows the associations between the ranges and types of landmark sign in the map image.

For example, to recall a memory or to obtain a clue to memory, tourist facilities are important for the user. Therefore, landmark signs representing tourist facilities are added to the map image irrespective of whether each of the landmark signs is included in one of the predetermined ranges. Furthermore, to recall a place where the user had a meal, information on restaurants near an image-pickup position and a moving route is important for the user. However, information on restaurants located far from the image-pickup position and the moving route is not important for the user. Therefore, in the first to third predetermined ranges, landmark signs representing restaurants are added to the map image. Furthermore, when the user goes to shopping, information on convenience stores near the current position is important for the user. However, information on convenience stores located far from the current position is not important for the user. Therefore, in the third predetermined range; landmark signs representing convenience stores are added to the map image. Furthermore, to recall a memory, for example, information on banks is not important for the user. Therefore, landmark signs representing banks are not added to the map image. Note that, when the image pickup apparatus is used as a navigation apparatus, the landmark signs representing banks are added to the map image so that the user reaches a destination with ease while checking positions of the banks and the like.

As described above, the number of landmark signs is considerably reduced by changing types of landmark sign to be added to the map image depending on a reference position and by reducing the types of landmark sign to be added to the map image in ranges which are not important for the user.

Furthermore, when the operation signal SS supplied from the user interface unit 32 represents an operation of changing the landmark-display control table, the controller 31 may display important information selected by the user near a desired position. For example, in a case where information on banks near the current position is important for the user, the user is allowed to perform an operation of changing a setting about banks included in the third predetermined range from "nondisplay" to "display". As described above, if the landmark-display control table is changeable, the landmark signs representing banks are added to the third predetermined range which is a range near the current position.

Figure 9A:
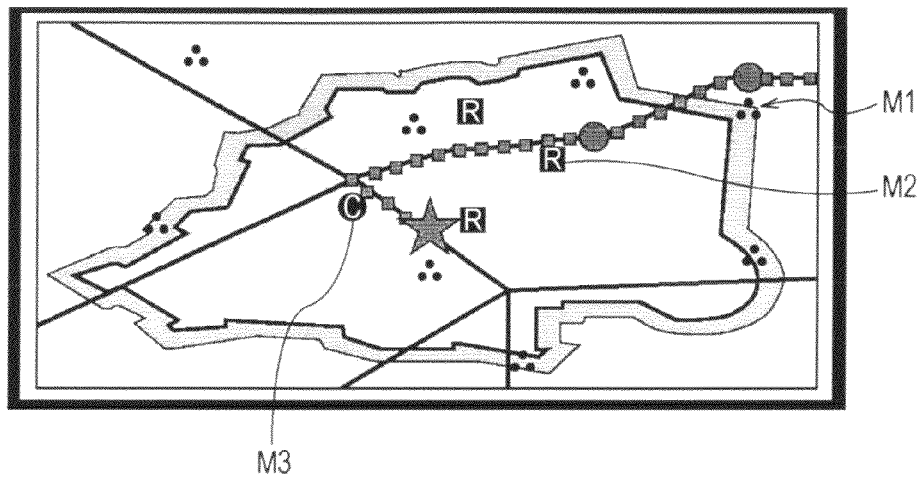
FIG. 9A is a diagram illustrating an image obtained when control of landmark display is performed using the landmark-display control table shown in FIG. 8.
Figure 9B:
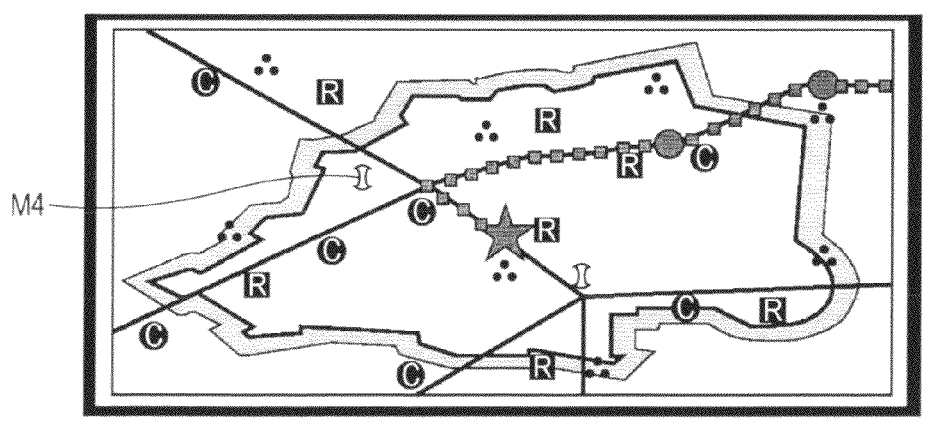
FIG. 9B is a diagram illustrating an image obtained when control of a landmark display is performed in a conventional method.

Next, referring to FIGS. 9A and 9B, the map image including the landmark signs will be described. Note that FIG. 9A shows an image obtained when control of landmark display is performed using the landmark-display control table shown in FIG. 8. Furthermore, FIG. 9B shows a case where landmark signs are displayed in a conventional method as a reference.

When the control of landmark display is performed using the landmark-display control table shown in FIG. 8, a landmark signs M1 representing tourist facilities and landmark signs M2 representing restaurants are added in the first predetermined range determined based on the image-pickup position as shown in FIG. 9A. Furthermore, the landmark signs M1 representing tourist facilities and the landmark signs M2 representing restaurants are added in the second predetermined range determined based on the moving route. Moreover, the landmark signs M1 representing tourist facilities, the landmark signs M2 representing restaurants, and a landmark sign M3 representing a convenience store are added in the third predetermined range determined based on the current position. Furthermore, the landmark signs M1 representing tourist facilities are added in other ranges. As described above, a reduced number of types of landmark sign are displayed in the map image in the ranges other than the first to third predetermined ranges. Therefore, as shown in FIG. 9B, it is not likely that the screen is in a busy state due to a number of landmark signs including landmark signs M4 representing banks.

Accordingly, in a case where a memory is recalled, for example, although landmark signs are displayed so that desired information is obtained, landmark signs which are to be located far from an image-pickup position, a moving route, and a current position and which are not important for the user are not displayed in the map image. In this way, map display is performed while landmark display is optimized.

Furthermore, an apparatus used to display the image-pickup positions in the map image mainly corresponds to a certain device such as a digital still camera, and therefore, the apparatus has a lower processing capability relative to a general navigation apparatus. However, since a process of adding landmark signs which are not important for the user to the map image is not required, a map including landmark signs is displayed at high speed even though the apparatus has the low processing capability.

The invention claimed is:

1. A map display apparatus comprising:
   an information recording unit which records image information including an image signal representing a picked-up image and position information representing an image-pickup position where the image signal is generated, and landmark information used to display landmark signs in a map image;
   a display controller which adds an image-pickup-position mark in the image-pickup position represented by the image information to the map image, which adds landmark signs in portions represented by the landmark information to the map image, and which selectively reduces the number of types of landmark sign to be added to the map image in a number of predetermined ranges; and
   a user interface unit which enables a user to select a desired one or ones of the types of landmarks signs to be displayed in each predetermined range and which enables the user to select a desired one or ones of the types of landmarks signs to be not displayed in each said predetermined range,
   in which the number of predetermined ranges includes a first predetermined range which is determined based on the image-pickup position, a second predetermined range determined based on a moving route in the map image, and a third predetermined range determined based on a current position in the map image, and
   in which each of the first predetermined range, the second predetermined range, and the third predetermined range is different from each other.

2. The map display apparatus according to claim 1,
wherein the information recording unit records position information representing the moving route, and
the display controller adds moving-route marks to the map image in accordance with the position information representing the moving route, and adds a reduced number of the types of landmark sign in ranges other than the second predetermined range.

3. The map display apparatus according to claim 2, further comprising:
a position information generation unit which generates position information representing the current position,
wherein the display controller adds a current position mark representing the current position to the map image in accordance with the position information generated by the position information generation unit, and adds a reduced number of the types of landmark signs in ranges other than the third predetermined range.

4. A map display method comprising:
an information reading step of reading, from an information recording unit which records image information including an image signal representing a picked-up image and position information representing an image-pickup position where the image signal is generated and landmark information used to display landmark signs in a map image, the image information and the landmark information;
a display control step of, in accordance with the read image information and the read landmark information, adding an image-pickup-position mark in an image-pickup position represented by the image information to the map image, adding landmark signs in portions represented by the landmark information to the map image, and selectively reducing the number of types of landmark sign to be added to the map image in a number of predetermined ranges; and
a user enabling step of enabling the user to select a desired one or ones of the types of landmarks signs to be displayed in each predetermined range and enabling the user to select a desired one or ones of the types of landmarks signs to be not displayed in each said predetermined range,
in which the number of predetermined ranges includes a first predetermined range which is determined based on the image-pickup position, a second predetermined range determined based on a moving route in the map image, and a third predetermined range determined based on a current position in the map image, and
in which each of the first predetermined range, the second predetermined range, and the third predetermined range is different from each other.

5. An image pickup apparatus comprising:
an image pickup unit which generates an image signal representing a picked-up image;
a position information generation unit which generates position information representing a position of the image pickup unit;
an information recording processor which generates and records, using the position information generated by the position information generation unit when the image signal representing the picked-up image is generated as position information representing an image-pickup position, image information including the position information and the image signal representing the picked-up image;
a landmark information storage unit which stores landmark information used to add landmark signs to a map image;
a display controller which adds an image-pickup-position mark in the image-pickup position represented by the image information to the map image, which adds the landmark signs in portions represented by the landmark information to the map image, and which selectively reduces the number of types of landmark sign to be added to the map image in a number of predetermined ranges; and
a user interface unit which enables a user to select a desired one or ones of the types of landmarks signs to be displayed in each predetermined range and which enables the user to select a desired one or ones of the types of landmarks signs to be not displayed in each said predetermined range,
in which the number of predetermined ranges includes a first predetermined range which is determined based on the image-pickup position, a second predetermined range determined based on a moving route in the map image, and a third predetermined range determined based on a current position in the map image, and
in which each of the first predetermined range, the second predetermined range, and the third predetermined range is different from each other.

* * * * *